Aug. 11, 1942.   N. E. HENDRICKSON   2,292,637
CHAIN CABLE
Filed July 2, 1941

Inventor
Niels E. Hendrickson
By
Attorney

Patented Aug. 11, 1942

2,292,637

UNITED STATES PATENT OFFICE 2,292,637

CHAIN CABLE

Niels E. Hendrickson, Toledo, Ohio

Application July 2, 1941, Serial No. 400,779

3 Claims. (Cl. 59—35)

My invention has for its object to produce a chain cable of great tensile strength and wherein the links may be heat treated to still further increase the strength. It also has for its object to provide a method whereby such a chain may be produced rapidly and at a low cost.

The invention may be contained in a chain formed of interconnected links of different forms that may be produced by the method described hereinafter without departing from the spirit of the invention as presented in the claims appended hereto.

Figure 1:
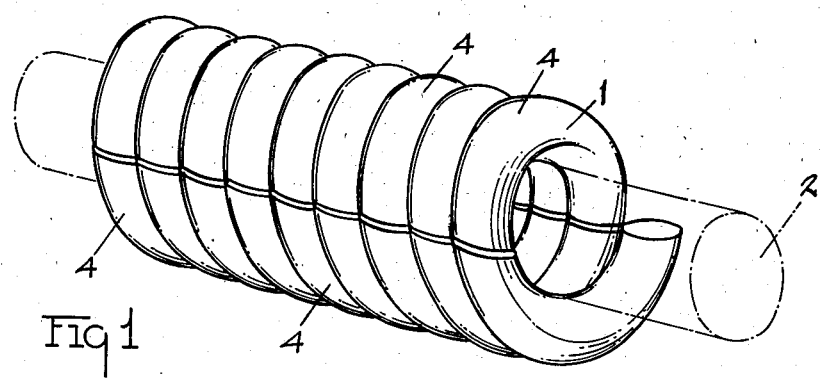
Figures 2, 3:
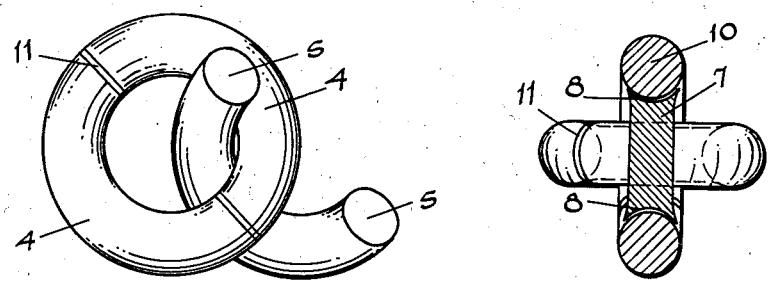
Figure 4:
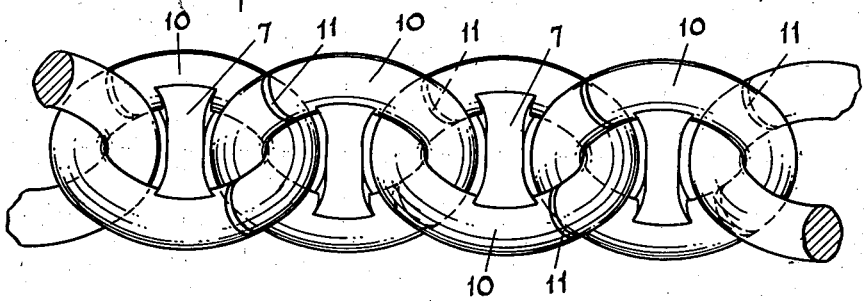

Figure 1 of the drawing illustrates a substantially closed helix of round steel rod of one to two and one-half inches or more in diameter and cut substantially along a plane of the axis of the helix. Figure 2 illustrates the formation of the chain by flash-welding the ends of the halves of the turns of the helix and insertion of halves of the turns of the contiguous links of the chain that are subsequently welded to other halves of turns of the helix. Figure 3 illustrates a section of a link and shows particularly the contour of a stud secured in each link and located intermediate the ends of the contiguous links and in a defined relation with respect to the end welds of the link in which the stud is secured. Figure 4 is a perspective view of a part of the chain.

The metal rod from which the chain is formed is first formed helically, as indicated at 1, usually on a mandrel, such as the mandrel indicated at 2, and preferably wound close to form the turns of the helix. Half turns 4 are formed by cutting along a plane passing through the axis of the spiral, thereby producing the end surfaces 5. The cut may be so formed that the end surfaces 5 of the half turns will approximately contact throughout their areas when the end surfaces of any of the half turns are juxtaposed with the end surfaces of any other of the half turns that may be formed by the cuts. The ends of each pair of half turns may then be united, preferably by flash-welding to melt and coalesce the metal of the half turns to form, in each case, a complete circle or annulus and locate the half turns used in forming each link substantially in a common plane.

The substantially circular links may then be heated and pressed, if desired, in suitable forms or dies, to produce elliptical links, and during the formation, the cross studs 7 may be located and secured in position in the links. The studs 7 may be formed of the metal of the rod from which the links are formed. The ends of the studs are formed to have cylindrical seats 8 that substantially fit the surfaces of the rod parts of which the links are formed. The studs are disposed intermediate the sides of the links and have a length to enable the conversion of the circular links into elliptical form. The links are heated and the studs while cold are located in position while the links are hot and shaped. The end surfaces of the studs engage the side surfaces of the links and thus the studs are locked along the minor axis of the elliptically formed links 10. Immediately after shaping the links to ovate form, they may be quenched while hot in any suitable medium, and thus harden, and the hardness may then be tempered to a desired degree. Also, after shaping, the chain links may be again inserted in a furnace and heated to any desired temperature for hardening and subsequently quenched and drawn to the desired temper.

The ends of the studs are so disposed as to locate the welds 11 of each elliptically formed link intermediate, preferably halfway between, the ends of the studs and the end of the major axis of the links. Thus the end portions of the elliptical formed links have legs of different lengths and the ends of the studs engage the longer legs at points to dispose the welds on opposite sides of the stud, that is, one weld is on one side and near to one end of the stud, and the other weld is on the other side of the stud and near to the other end of the stud. This locates the welded points, or any enlargements or protrusions produced by the welds, remote from the ends of the contiguous links and the ends of the studs to prevent fracture of the link at the weld by the wedge-wise action of the interconnected links and excess pressure of the sides of the link on the ends of the studs when the chain is under tension. This also locates the enlargements, ordinarily produced in making the welds, at points on the links such that they will not interfere with free movement of the chain through hawser-hole or free movement of the interconnecting links relative to each other during the manipulation of the chain.

I claim:

1. The method of forming a chain ovate link having a cross-stud and consisting in forming semi-circular metal parts; welding the semi-circular parts together at their ends to form an annulus; heating the annulus; inserting the stud intermediate the sides of the annulus so as to dispose opposite ends of the stud to locate the points of the welds centrally between the ends of the major axis of the links and the ends of the studs; and forcing the opposite sides of the annulus toward each other and the said sides against the said ends of the stud.

2. The method of forming a link for a chain of connected links having cross studs and consisting in forming bent link end parts, each end part having legs of different lengths; welding the end surfaces of the longer legs of the end parts of the link to the end surfaces of the shorter legs; forming studs having concave end surfaces substantially corresponding in curvature to the side surfaces of the longer legs of the end parts, positioning the cold unheated studs between the longer legs, while the end parts of the link are hot and welded and at a midpoint between the ends of the link; and locking the studs in the link by cooling shrinkage of the said end parts of the link.

3. The method of forming a chain of elliptical links having cross studs and consisting in forming bent link end parts; each end part having legs of different lengths; welding the end surfaces of the legs of the bent end parts forming each link; inserting cold studs having concave end surfaces substantially corresponding in curvature to the side surfaces of the end parts, between the longer legs of the end parts to locate the end surfaces of the studs in spaced relation to the welds; and progressively inter-locking end parts of contiguous links into the formed links, welding the end surfaces of the legs of the end parts of the said contiguous links, and inserting cold studs between the hot longer legs welded end parts of the said contiguous links.

NIELS E. HENDRICKSON.